United States Patent
Watanabe et al.

(10) Patent No.: US 6,749,913 B2
(45) Date of Patent: Jun. 15, 2004

(54) STOCK MATERIAL FOR CONTAINER BODY OF INSULATING PAPER CONTAINER, INSULATING PAPER CONTAINER AND PROCESS FOR MAKING THEM

(75) Inventors: Hiromi Watanabe, Fuji (JP); Isao Kuwahara, Fuji (JP)

(73) Assignee: Sanyo Pax Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/354,464

(22) Filed: Jul. 15, 1999

(65) Prior Publication Data

US 2003/0190440 A1 Oct. 9, 2003

(30) Foreign Application Priority Data

Jul. 17, 1998 (JP) .......................................... 10-202478

(51) Int. Cl.$^7$ ................................................ B65D 3/22
(52) U.S. Cl. .................. 428/36.5; 428/35.7; 428/321.3; 229/403; 264/46.4; 493/53; 493/903
(58) Field of Search ............................... 428/35.7, 36.5, 428/321.3; 229/400, 403; 264/46.4, 134; 493/53, 149, 903

(56) References Cited

U.S. PATENT DOCUMENTS

| | | | | |
|---|---|---|---|---|
| 3,049,463 A | * | 8/1962 | Kallander et al. | 156/230 |
| 3,368,014 A | * | 2/1968 | Tijunelis | 264/132 |
| 4,198,456 A | * | 4/1980 | Adams et al. | 428/159 |
| 4,435,344 A | | 3/1984 | Iioka | 264/45.1 |
| 5,490,631 A | * | 2/1996 | Iioka et al. | 229/403 |
| 5,873,641 A | * | 2/1999 | Spinelli | 312/114 |
| 6,129,653 A | | 10/2000 | Fredricks et al. | 493/110 |
| 6,416,829 B2 | | 7/2002 | Breining et al. | 428/34.2 |
| 6,482,481 B1 | | 11/2002 | Fredricks et al. | 428/34.2 |
| 6,565,934 B1 | | 5/2003 | Fredricks et al. | 428/34.2 |
| 2002/0148832 A1 | | 10/2002 | Breining et al. | 220/62.12 |
| 2002/0150705 A1 | | 10/2002 | Breining et al. | 428/34.2 |
| 2002/0187286 A1 | | 12/2002 | Breining et al. | 428/34.2 |

FOREIGN PATENT DOCUMENTS

| | | |
|---|---|---|
| JP | 4832283 | 10/1973 |
| JP | 48-032283 | 10/1973 |
| JP | 51-005380 | 2/1976 |
| JP | 51-115167 | 10/1976 |
| JP | 57110439 | 7/1982 |
| JP | 57-110439 | 7/1982 |
| JP | 542929 | 2/1993 |
| JP | 7232774 | 9/1995 |
| JP | 995368 | 4/1997 |
| JP | 9142435 | 6/1997 |
| JP | 11-189279 | 7/1999 |

OTHER PUBLICATIONS

Torii, Masanori, JP40902450A (Abstract).*
Mark, H et al. Encyclopedia of Polymer Science & Technology, 1986, vol. 6, p. 413.*
Merriam–Webster's Collegiate Dictionary, Tenth Edition, 1997, p. 451.*
Polymers–A Property Database, Polyethylene, High density, metlting point, homopolymer, 2000.*
Mark, H et al. Encyclopedia of Polymer Science & Technology, 1986, vol. 6, p. 413.*
English Abstract, JP Publication 11–189279, Application No. 10–202478.*

* cited by examiner

Primary Examiner—Harold Pyon
Assistant Examiner—Sow-Fun Hon
(74) Attorney, Agent, or Firm—Morrison & Foerster LLP

(57) ABSTRACT

An insulating paper container's body has a low m.p. thermoplastic synthetic resin film laminated on its outer wall surface and a compatibly expansile ink applied to the outer surface either as a primer or as indicia to provide stock material improved in its printability for bar codes or the like as well as in its insulating property. In addition there is provided a process for making such stock material.

60 Claims, 2 Drawing Sheets

STOCK MATERIAL FOR CONTAINER BODY OF INSULATING PAPER CONTAINER, INSULATING PAPER CONTAINER AND PROCESS FOR MAKING THEM

This application claims priority from Japanese Patent Application No. 10-202478 filed Jul. 17, 1998.

BACKGROUND OF THE INVENTION

1. Field of the Invention

This invention relates to stock material for a container body of an insulating paper container having low melting point (m.p.) thermoplastic synthetic resin film laminated on the outer wall surface of said container body and expanded, the container and a process for making them.

2. Description of the Related Art

Japanese Patent Publication Gazette No. 1973-32283 describes the process comprising steps of laminating low m.p. thermoplastic synthetic resin film on at least one surface of moisture containing paper destined to become stock material for the container body and heating this film so that said film may be expanded to present an irregular surface under a pressure of water vapor discharged from said moisture containing paper constituting stock material. This literature describes also the technique such that the opposite surface of said paper is formed with a layer adapted to hold water vapor generated during the step of heating.

Japanese Patent Application Disclosure Gazette No. 1982-110439 describes, in regard to a paper container generally comprising the container body and the bottom wall, the process comprising steps of laminating low m.p. thermoplastic synthetic resin film on outer wall surface of said container body and heating this film so that said film may be expanded so as to present an irregular surface under a pressure of water vapor generated from moisture contained in the base paper. This literature describes also the technique such that a similar expandable thermoplastic synthetic resin film is laminated on the opposite surface of the base paper or this opposite surface is coated with aluminum foil so as to hold a pressure of water vapor generated during the step of heating.

Japanese Patent Application Disclosure Gazette No. 1993-42929 describes, in regard to the paper container generally comprising the container body and the bottom wall, the process comprising steps of doubly laminating low m.p. thermoplastic synthetic resin film and high m.p. thermoplastic synthetic resin film on outer wall surface of base paper of the container body and heating them so that only the low m.p. thermoplastic synthetic resin film forming the inner layer may be expanded and thereby the two-layered insulating paper container having the smooth and glossy outer layer. This literature described also the technique such that high m.p. thermoplastic synthetic resin film is laminated on the opposite surface of the base paper as a layer serving to hold a pressure of water vapor generated during heating treatment.

Japanese Patent Application Disclosure Gazette No. 1995-232774 describes, in regard to the paper container generally comprising the container body and the bottom wall, the process comprising steps of printing the base paper of the container body in a desired region on its outer wall surface with organic solvent containing ink, then laminating low m.p. thermoplastic synthetic resin film on said outer wall surface inclusive of the surface of said print, and heating this so that the printed region may be expanded more thickly than the remaining region to form the insulating paper container having locally different thickness. Description is also found in this literature that the step of printing may include a step of applying an anti-volatility layer in order to form an unexpanded region and a step of laminating high m.p. thermoplastic synthetic resin film on the opposite surface of the base paper.

Japanese Patent Application Disclosure Gazette No. 1997-95368 describes, in regard to the insulating paper container generally comprising the container body and the bottom wall, the process comprising steps of laminating low m.p. thermoplastic synthetic resin film on outer wall surface of the base paper for the container body applying desired region or regions on the upper surface of said film with synthetic resin ingredient containing coating and heating this so as to form expansion-inhibited region or regions corresponding to said region or regions on the outer surface of the container body applied with said synthetic resin ingredient containing coating.

Japanese Patent Application Disclosure Gazette No. 1997-142435 describes, in regard to the insulating paper container generally comprising the container body and the bottom wall, the process comprising steps of providing the outer wall surface of the base paper for the region or regions with printed layer, coating said printed region or regions with a layer of transparent varnish, laminating low m.p. thermoplastic synthetic resin film on the upper surface of said layer of transparent varnish and heating this film so as to achieve a uniform expansion and a satisfactory insulating property.

For every insulating paper container as disclosed in the above-identified documents, it is obviously essential to print various indications on the container body and particularly important to print the point-of-sale (POS) bar codes thereon so that they may be reliably read. In the case of such container having an expanded layer on the printed POS bar codes, said expanded layer often makes it to read the POS bar codes.

Especially for the case in which the POS bar codes are directly printed on the thermoplastic synthetic resin film laminated on the container body followed by expanding treatment, there is an apprehension that the printed bar codes might be deformed or distorted due to expansion of the film and reading of said POS might be adversely affected.

To solve this problem, Japanese Patent Application Disclosure Gazette No. 1995-232774 describes the countermeasure such that the outer wall surface of the base paper for the container body is formed with the expansile layer for printing and at the same time partially formed with the unexpanded region by coating said outer wall surface with the anti-volatility layer. Japanese Patent Application Disclosure Gazette No. 1997-95368 describes the countermeasure such that the upper surface of the low m.p. thermoplastic synthetic resin film laminated on the outer wall surface of the base paper for the container body is partially coated with the layer containing the expansion inhibiting synthetic resin followed by heating treatment in order to form an expansion inhibited region on the outer wall surface of the container body on which the POS bar codes may be distinctly printed. However, both the unexpanded region and the expansion inhibited region inevitably cause the corresponding recess to be formed on the outer surface of the container body which should be smooth. Such recess is undesirable from the viewpoint of the convenience for handling as well as of the aesthetic appearance. In addition, the insulating effect sufficient to ensure that the consumer can hold the container without any apprehension of getting burned on the hand cannot be expected in such unexpanded region and expansion inhibited region. Furthermore, the above-mentioned countermeasures of prior art result in unevenness of the insulating property.

SUMMARY OF THE INVENTION

In view of the problems as have been described above, the invention aims to provide stock material for the insulating paper container improved in its printability for bar codes or the like as well as in its insulating property, an improved process for making such stock material and an improved process for making the insulating paper container and the resulting containers.

The invention provides a process for making stock material for a container body of an insulating paper container, said process comprising steps of: laminating low m.p. thermoplastic synthetic resin film which is expandable by heating treatment on the outer wall surface of base paper as said stock material for the container body of the insulating paper container and applying the surface of said low m.p. thermoplastic resin film with compatibly expansile ink adapted to be expansile compatibly with expansion of said film.

The compatibly expansile ink is expansile in response to expansion of the low m.p. thermoplastic synthetic resin film without obstructing the expansion of said film. Accordingly, the low m.p. thermoplastic synthetic resin film to be expanded may be previously applied on its surface with said compatibly expansile ink to obtain a smooth printing surface substantially free from a touch of irregularity after said thermoplastic synthetic resin film has been expanded. In this way, POS bar codes or the like can be distinctly printed on the layer of said compatibly expansile ink.

In addition, the low m.p. thermoplastic synthetic resin film to be expanded may be previously applied on its surface with said compatibly expansile ink to prevent the printing ink from being soaked into the base paper and thereby to facilitate a recycling treatment of the base paper from the used insulating paper container according to this invention.

This invention provides a process further including a step of applying said surface of the low m.p. thermoplastic synthetic resin film which is expandable by the heating treatment with said compatibly expansile ink as a primer.

The property of said compatibly expansile ink allows the thermoplastic synthetic resin film to offer the smooth printing surface substantially free from a touch of irregularity after its expansion advantageously provides various possibilities. First, said compatibly expansile ink previously applied as primer on the entire surface of the thermoplastic synthetic resin to be expanded ensures the expanded resin surface to present an appearance as if it is the surface of the base paper itself. Upon such a surface, various objects can be printed in so-called false printing fashion, i.e., as if they are printed on the base paper's background texture.

Secondly, the compatibly expansile ink is able to confine the water vapor generated from the low m.p. thermoplastic synthetic resin film during its expansion and thereby to promote the expansion rather than inhibiting it. As a result, the compatibly expansile ink is effective to increase a thickness of the expanded synthetic resin film without being affected by printing.

This invention also provides a process wherein the compatibly expansile ink applied as said primer is of white color. The compatibly expansile ink of white color may be applied on the resin film as primer to ensure that the surface of the expanded resin appears like the white background of paper and gives the paper container a good aesthetic appearance.

This invention provides a process further including a step of printing patterns, designs, letters, bar codes or the like on the surface of said compatibly expansile ink using separately prepared compatibly expansile ink.

In view of the advantageous property of the compatibly expansile ink allowing a smooth printing surface free from a touch of irregularity on the expanded thermoplastic synthetic resin, separately prepared ink of the similar property may be used to print patterns, designs, letters, bar codes or the like on such smooth printing surface to obtain a distinct image of POS bar codes or the like.

This invention provides the process according to any one of Claims 1–4, further including a step of at least partially filling an interface defined between the base paper and the low m.p. thermoplastic synthetic resin film with a layer of self-expansile ink.

The layer of self-expansile ink disposed between the base paper and the low m.p. thermoplastic synthetic resin film to be expanded improves an expansion effect as well as an insulating effect of the container. This is for the reason that not only expansion of said self-expansile ink correspondingly increases the thickness of the container body's wall but also the region of the resin covered with said self-expansile ink is expanded with air bubbles of relatively large sizes and, thus, an advantageously thick layer of expansion is obtained. Accordingly, the interface defined between the base paper and the low m.p. thermoplastic synthetic resin film may be fully filled with the self-expansile ink and said effects may be correspondingly improved.

This invention also provides a process further including a step of laminating high m.p. thermoplastic synthetic resin film which is unexpanded even by heating treatment on the inner wall surface of the base paper as stock material for the container body.

The high m.p. thermoplastic synthetic resin film which is unexpanded even by heating treatment may be laminated on the inner wall surface of the stock material for the container body to block evaporation of moisture from said inner wall surface of the base paper, to promote expansion of the low m.p. thermoplastic synthetic resin film on the outer wall surface of the base paper and to ensure a sealability of the container after heating treatment.

This invention provides a process wherein the low m.p. thermoplastic synthetic resin film which is expandable by heating treatment is made of low density polyethylene having a MFR (melt flow rate) of 8–15 g/10 min and a thickness of 0.03–0.07 mm.

The low density polyethylene having a MFR (melt flow rate) of 8–15/10 min and a thickness of 0.03–0.07 mm may be used as the low m.p. thermoplastic synthetic resin film to facilitate the step of lamination on the base paper and to ensure that the compatibly expansile ink may follow expansion of said low density polyethylene and thereby may cover the expanded surface in the form of a smooth printing surface.

This invention provides a process wherein the high m.p. thermoplastic synthetic resin film which is unexpanded even by heating treatment is made of medium density polyethylene having a MFR (melt flow rate) of 4–8/10 min.

The medium density polyethylene having a MFR (melt flow rate) of 4–8 g/10 min may be used as the high m.p. thermoplastic synthetic resin film to facilitate the step of lamination on the base paper and to ensure a high sealability of the container after heating treatment.

This invention also provides a process wherein the base paper is obtained by the fortlinear paper machine or the cylinder paper machine.

Paper of a high air-permeability obtained by the fortlinear paper machine or the cylinder paper machine may be used as the base paper to obtain many advantageous properties including appropriate thickness and strength, high workability for lamination, high workability for assembling the container, high moisture content and high vaporability. These properties are effective to improve the expanding effect.

This invention provides also stock material for a container body of an insulating paper container, said stock material comprising: base paper; high m.p. thermoplastic synthetic resin film laminated on the inner wall surface of said base paper; low m.p. thermoplastic synthetic resin film laminated on the outer wall surface of said base paper wherein said low m.p. thermoplastic synthetic resin film is expandable by heating treatment; and compatibly expansile ink applied on the upper surface of said low m.p. thermoplastic synthetic resin film.

This invention provides stock material wherein said compatibly expansile ink is applied on upper surface of the low m.p. thermoplastic synthetic resin film which is expandable by heating treatment as primer.

This invention provides stock material wherein said compatibly expansile ink applied as said primer is of white color.

This invention provides stock material wherein the upper surface of said compatibly expansile ink is printed with patterns, designs, letters, bar codes or the like using separately prepared compatibly expansile ink.

This invention provides stock material wherein an interface defined between the base paper and the low m.p. thermoplastic synthetic resin film is at least partially filled with a layer of self-expansile ink.

This invention provides stock material wherein the low m.p. thermoplastic synthetic resin film which is expandable by heating treatment is made of low density polyethylene having a MFR (melt f low rate) of 8–15 g/10 min and a thickness of 0.03–0.07 mm.

This invention provides stock material wherein the high m.p. thermoplastic synthetic resin film which is unexpanded even by heating treatment is made of medium density polyethylene having a MFR (melt flow rate) of 4–8 g/10 min.

This invention provides also an insulating paper container generally comprising a container body and a bottom wall, said insulating paper container further comprising: high m.p. thermoplastic synthetic resin film laminated on the inner wall surface of base paper for said container body and bottom wall; low m.p. thermoplastic synthetic resin film laminated on the outer wall surface of the base paper for said container body; compatibly expansile ink applied on the upper surface of said low m.p. thermoplastic synthetic resin film so that said ink may follow expansion of said low m.p. thermoplastic synthetic resin film; and said low m.p. thermoplastic synthetic resin film being expanded by subjecting the lamination to heating treatment.

This invention provides an insulating paper container wherein the upper surface of the low m.p. thermoplastic synthetic resin film which is expandable by heating treatment is applied with said compatibly expansile ink as primer.

This invention provides an insulating paper container wherein said compatibly expansile ink applied as said primer is of white color.

This invention provides an insulating paper container wherein the upper surface of said compatibly expansile ink is printed with patterns, designs, letters, bar codes or the like using separately prepared compatibly expansile ink.

This invention provides an insulating paper container wherein an interface defined between the base paper and the low m.p. thermoplastic synthetic resin film is at least partially filled with self-expansile ink.

This invention provides an insulating paper container wherein the low m.p. thermoplastic synthetic resin film is laminated on the outer wall surface of the base paper for the bottom wall and said low m.p. thermoplastic synthetic resin film is expanded by subjecting the lamination to heating treatment.

In the case of the container like a bowl which is relatively large in its diameter and relatively small in its height, the consumer's hand may sometimes come in contact with the bottom of such container. The apprehension that the consumer might get burned on the hand can be effectively avoided by coating the outer wall surface of the stock material for the bottom wall with the expanded insulating layer.

This invention provides an insulating paper container wherein the low m.p. thermoplastic synthetic resin film is laminated on the upper surface of the high m.p. thermoplastic synthetic resin film which is unexpanded even by heating treatment, said high m.p. thermoplastic synthetic resin film, in turn, being laminated on the inner wall surface of the base paper for the bottom wall of the insulating paper container, and the low m.p. thermoplastic synthetic resin film laminated on the base paper for the container body of the insulating paper container is expanded by subjecting the lamination to heating treatment.

The low m.p. thermoplastic synthetic resin film may be laminated on the surface of the high m.p. thermoplastic synthetic resin film which is, in turn, laminated on the inner wall surface of the base paper used as the stock material for the bottom wall not only to improve the insulating property of the bottom wall but also to ensure a high sealability on the inner wall surface of the container. Such high sealability is obtained for the reason that the high m.p. thermoplastic synthetic resin film laminated on the inner wall surface of the base paper used as the stock material for the container body is firmly heat-sealed with the low m.p. thermoplastic synthetic resin film on the inner wall surface of the bottom wall.

This invention provides an insulating paper container wherein the low m.p. thermoplastic synthetic resin film which is expandable by heating treatment is made of low density polyethylene having a MFR (melt flow rate) of 8–15 g/10 min and a thickness of 3–0.07 mm.

This invention provides an insulating paper container wherein the high m.p. thermoplastic synthetic resin film which is unexpanded even by heating treatment is made of medium density polyethylene having a MFR (melt flow rate) of 4–8 g/10 min.

This invention provides an insulating paper container wherein the base paper has a basis weight of 150–350 g/m² and a moisture content of 5–9%.

In view of desired strength and workability of the base paper as well as desired expansion ratio and post-expansion insulating property of the laminated thermoplastic synthetic resin, the base paper preferably has a basis weight of 150–350 g/m² and a moisture content of 5–9%.

This invention provides an insulating paper container wherein the base paper is product obtained by the fortlinear paper machine or the cylinder paper machine.

This invention provides also a process for making an insulating paper container generally comprising a container body and a bottom wall, said process comprising steps of: laminating high m.p. thermoplastic synthetic resin film on the inner wall surface of base paper for said container body and bottom wall; laminating low m.p. thermoplastic synthetic resin film on the outer wall surface of the base paper for said container body; applying the upper surface of said low m.p. thermoplastic synthetic resin film with compatibly expansile ink so that said ink may follow expansion of said low m.p. thermoplastic synthetic resin film and after the container has been formed by said container body and bottom wall, expanding said low m.p. thermoplastic synthetic resin film by subjecting the lamination to heating treatment.

This invention provides a process further including a step of applying the surface of said low m.p. thermoplastic synthetic resin film to be expanded by heating treatment with said compatibly expansile ink as primer.

This invention provides a process wherein said compatibly expansile ink applied as said primer is of white color.

This invention provides a process further including a step of printing the upper surface of said compatibly expansile ink with patterns, designs, letters, bar codes or the like using separately prepared compatibly expansile ink.

This invention provides a process further including a step of at least partially filling an interface defined between the base paper and the low m.p. thermoplastic synthetic resin film with a layer of self-expansile ink.

This invention provides a process further including steps of laminating the low m.p. thermoplastic synthetic resin film on the outer wall surface of the base paper for the bottom wall and expanding said low m.p. thermoplastic synthetic resin film by subjecting the lamination to heating treatment.

This invention provides a process further including steps of laminating the low m.p. thermoplastic synthetic resin film on the high m.p. thermoplastic synthetic resin film which is unexpanded even by heating treatment and laminated on the inner wall surface of the base paper for the bottom wall of the insulating paper container and expanding the low m.p. thermoplastic synthetic resin film associated with the container body by subjecting the lamination to heating treatment.

This invention provides a process wherein the low m.p. thermoplastic synthetic resin film which is expandable by heating treatment and constitutes the stock material for the container body of the insulating paper container is made of low density polyethylene having a MFR (melt flow rate) of 8–15 g/10 min and a thickness of 0.03–0.07 mm.

This invention provides a process wherein the high m.p. thermoplastic synthetic resin film which is unexpanded even by heating treatment is made of medium density polyethylene having a MFR (melt flow rate) of 4–8 g/10 min.

This invention provides a process wherein the heating treatment is carried out at a temperature of 120–130° C. for 2–4 min.

The heating treatment may be carried out at a temperature of 12–130° C. for 2–4 minutes to ensure that the low m.p. thermoplastic synthetic resin film laminated on the outer wall surface of the base paper can be sufficiently expanded.

These and other features, objects and advantages of the present invention will become apparent upon reading the following description thereof together with reference to the accompanying drawings.

DETAILED DESCRIPTION OF THE PREFERRED EMBODIMENTS

The insulating paper container according to this invention generally comprises a container body 1 and a bottom wall 2.

Figure 2:
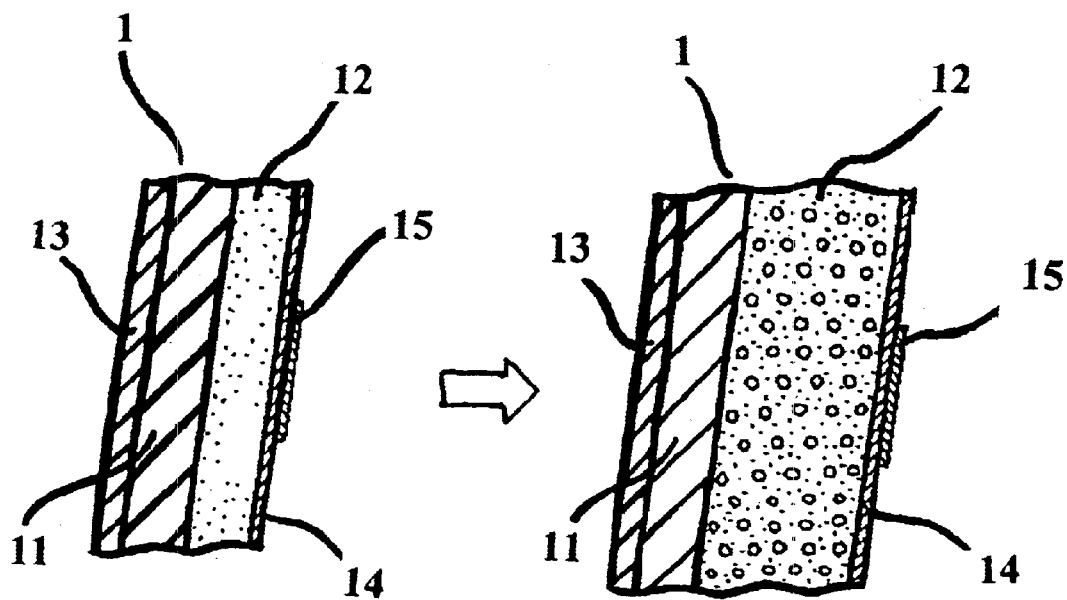
FIG. 2 is an enlarged fragmentary cross-sectional view showing, in the embodiment illustrated by FIG. 1, a portion on which the container is printed with expansion-followable ink and illustrating the manufacturing process.

A process for making the insulating paper container will be described, starting from a process for making the container body 1, more strictly, starting from a process for making stock material thereof. As shown in FIG. 2, the stock material of the container body comprises base paper 11, a low m.p. thermoplastic synthetic resin film 12 which is expandable by heating treatment laminated on the outer wall surface of said base paper 11, and a compatibly expansile ink 14 applied on a surface of said low m.p. thermoplastic synthetic resin film 12 opposite paper 11.

In the case of this specific embodiment, the base paper 11 maybe selected from wide range of types having a basis weight of 150–350 g/m$^2$ and a water content of 5–9%. However, in view of various factors such as insulating property and cost, the basis weight is preferably of 280–320 g/m$^2$ and the moisture content is preferably of 7.5–8.5%. The base paper is preferably of the type obtained from a fortlinear paper machine or a cylinder paper machine.

The low m.p. thermoplastic synthetic resin film 12 expandable under heating is preferably the low density polyethylene film having a density of 0.91–0.92 g/cm$^3$, a m.p. of 105–110° C., a MFR (melt flow rate) of 8–15 g/10 min, a thickness of 0.030–0.070 mm. With the MFR (melt flow rate) of 8–15 g/10 min and the thickness of 0.03–0.07 mm, expansion of the film will be followed by spreading of expansion-followable ink.

In the case of this embodiment, compatibly expansile ink 14 is resinous composition which contains pigment when it is colored and contains no pigment when it is colorless and transparent. Said resinous composition consists of urethane resin and vinyl chloride/vinyl acetate copolymer (vinyl chloride/acetate resin) appropriately viscosity adjusted by solvent such as ethyl acetate, methyl ethyl ketone or isopropyl alcohol so as to contain an amount of residual solvent as small as possible. Such ink scarcely obstructs expansion of polyethylene used as the thermoplastic synthetic resin film 12 to be expanded and allows the expanded thermoplastic synthetic resin film to obtain a smooth printing surface substantially free from a touch of irregularity. Therefore, the thermoplastic synthetic resin film to be expanded may be applied as primer over its entire surface with such compatibly expansile ink 14 to achieve so-called false printing or the like effect, i.e., to achieve printing so that the expanded resin film 12 might appear as if it is the base paper itself.

Medium or high m.p. thermoplastic synthetic resin film 13 is laminated on the inner wall surface of the base paper 11. This thermoplastic synthetic resin film 13 is not expanded during the heating treatment performed to expand said low m.p. thermoplastic synthetic resin film 12 and functions to prevent water vapor generated in the base paper 11 from being discharged.

According to this embodiment, the high m.p. thermoplastic synthetic resin film 13 is a medium density polyethylene film having a density of 0.93–0.95 g/cm³, m.p. of 130–135° C., a MFR (melt flow rate) of 4–8 g/10 min and a thickness of 0.015–0.030 mm. Said compatibly expansile ink 14 comprises, as has already been described, a resinous component consisting of vinyl chloride/vinyl acetate polymer and urethane resin, a solvent consisting of methyl ethyl ketone, ester acetate and IPA, and pigment for coloring. Expansion of this compatibly expansile ink 14 well follows expansion of the low density polyethylene film 12 without obstructing such expansion. Accordingly, even when the low density polyethylene film 12 is expanded after the surface of this low density polyethylene film 12 has been applied with said compatibly expansile ink 14, said surface of the film 12 remains smooth and substantially free from a touch of irregularity. In view of such advantageous characteristics, it is preferred to use such compatibly expansile ink 14 for the case in which surface of said film 12 must be printed in a relatively large area, e.g., the area to be occupied by one or more capital letters.

As will be understood from the characteristics as have been described above, said compatibly expansile ink 14 is extremely effective to print a ground texture of paper, i.e., to place so-called false print on the entire surface of the low m.p. thermoplastic synthetic resin film 12. Especially when the compatibly expansile ink 14 of white color is used, the texture peculiar to Japanese paper appears upon expansion, which cannot be achieved merely by expanding the film without printing. In this manner, the insulating paper container drastically improved in its insulating property as well as in its aesthetic appearance is obtained.

Accordingly, patterns, designs, letters, POS bar codes or other indicia may be printed on the upper surface of said compatibly expansile ink 14 using separately prepared compatibly expansile ink as shown at 15 to ensure that said patterns, designs, letters, POS bar codes or the like can be distinctly printed. This is for the reason that said compatibly expansile ink 14 enables the thermoplastic synthetic resin to leave a surface for printing substantially free from a touch of irregularity after said resin has been expanded.

Such advantageous result can be achieved merely by steps of applying as primer or partially the surface of the low density polyethylene film 12 with the compatibly expansile ink 14 which is transparent or of white or the other color and then with the separately prepared compatibly expansile ink 15 for the purpose of printing fine letters or designs such as patterns, photos or the like. When said photo or the like has already been printed on the film 12 using the compatibly expansile ink 14, it is also possible to apply the transparent compatibly expansile ink 15 on said compatibly expansile ink 14 as a layer for glazing and protecting purpose. Then the insulating paper container coated with the compatibly expansile ink layers 14, 15 may be subjected to expansion to ensure that these compatibly expansile ink layers 14, 15 are expanded compatibly with expansion of the low density polyethylene film 12 surrounding these ink layers 14, 15. As a result, a surface just like smooth film free from a touch of irregularity is obtained. In this manner, fine letters, photos or the like may be color-printed on the compatibly expansile ink layer 14 using the separately prepared compatibly expansile ink layer 15 without being deteriorated by expansion.

Referring to FIG. 2, the low m.p. thermoplastic synthetic resin film 12 was made of low density polyethylene having a density of 0.918 g/cm³, a melting point of 105° C., a MFR of 14 g/10 min and a thickness of 0.070 mm while the high m.p. thermoplastic synthetic resin film 13 was made of medium density polyethylene having a density of 0.939 g/cm³, a melting point of 133° C., a MFR of 7 g/10 min and a thickness of 0.020 mm. The base paper had a basis weight of 280 g/m², a thickness of 0.31 mm. and a moisture content of 8.5%. The surface of the low m.p. thermoplastic synthetic resin film 12 was entirely coated with the compatibly expansile ink 14 which was partially coated with the compatibly expansile ink 15 to obtain a lamination having a total thickness of 0.4 mm. Heating this lamination by a far infrared radiation heater at a temperature of 125° C. for 2–4 minutes expanded the low m.p. thermoplastic synthetic resin film 12 to a thickness of 0.370–0.670 mm and a total wall thickness of the container body reached to 0.7–1 mm, i.e., a total thickness was expanded to approximately 5–9 times of the initial total thickness. It was observed that the expansion ratio of the film 12 tends to increase as the moisture content of the base paper and the time period of heating increase.

Figure 1:
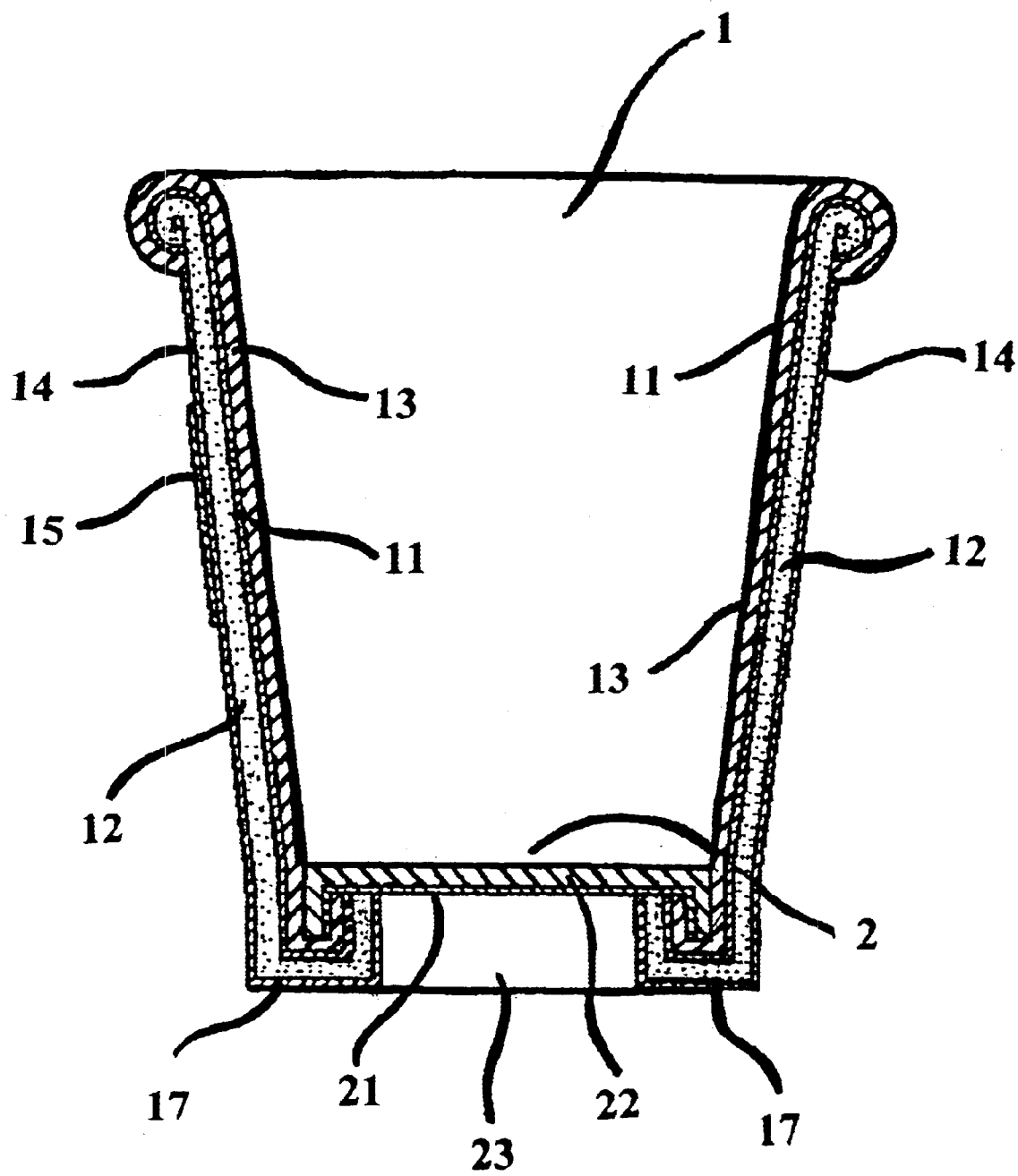
FIG. 1 is a vertical cross-sectional view showing one embodiment of an insulating paper container formed in accordance with this invention.

The lower end of the container body 1 is curled up about a peripheral edge of the container bottom wall 2 until this curled lower end 17 reaches the lower surface of said bottom wall 2 and thereby defines a raised bottom as seen in FIG. 1. In this case, said curled up lower end of the container body 1 also may be provided with the expanded layer to extend the desired insulating property down to the container bottom.

Figure 3:
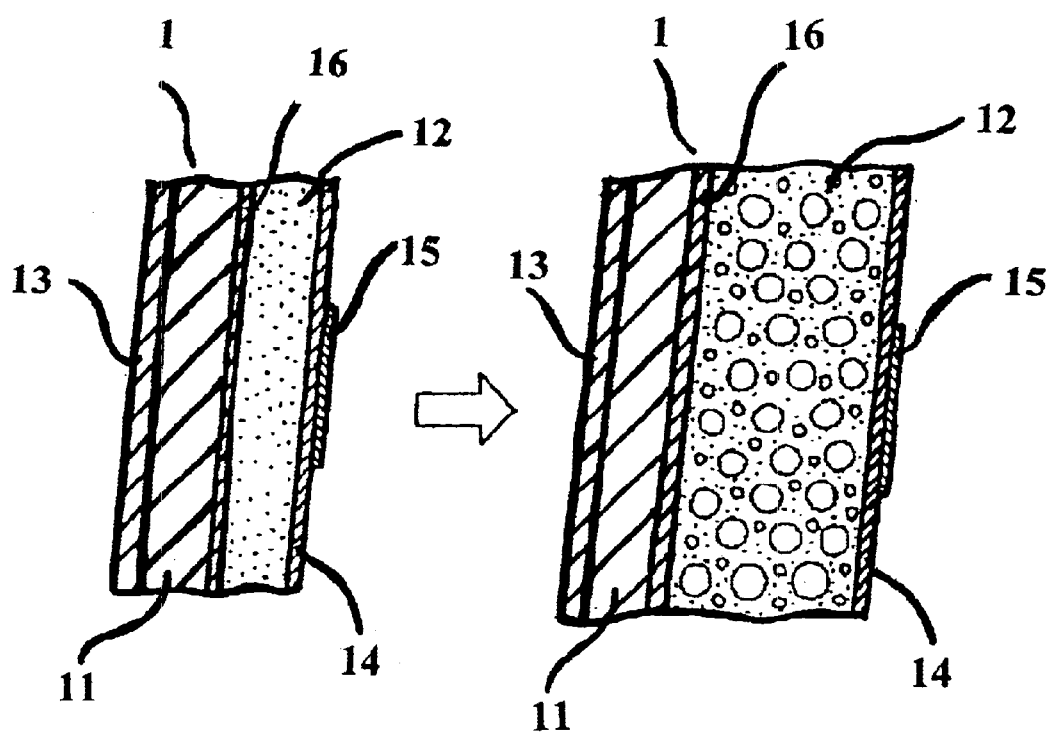
FIG. 3 is an enlarged fragmentary cross-sectional view showing, in an alternative embodiment, a portion on which the container is printed with compatibly expansile ink and illustrating the manufacturing process.

FIG. 3 shows the case in which a layer of self-expansile ink 16 is disposed between the base paper 11 and the low m.p. thermoplastic synthetic resin film 12 to be expanded.

The self-expansile ink 16 is composed of said compatibly expansile ink added with expanding agent and is expanded as said low m.p. thermoplastic synthetic resin film 12 is expanded. A total thickness of the expanded layer is increased not only by expansion of the self-expansile ink but also because the region of the thermoplastic synthetic resin film 12 underlying said self-expansile ink layer 16 generates air bubbles enlarged by the presence of said self-expansile ink layer 16. Thus a wall thickness of the container body is increased and, in consequence, the expanding effect as well as the insulating effect can be improved. Accordingly, if the interface defined between the base paper 11 and the low m.p. thermoplastic synthetic resin film 12 is entirely filled with said self-expansile ink 16, said effects can be correspondingly improved.

Referring to FIG. 3, the low m.p. thermoplastic synthetic resin film 12 was made of low density polyethylene having a density of 0.918 g/cm³, a melting point of 105° C., a thickness of 0.070 mm while the high m.p. thermoplastic synthetic resin film 13 was made of medium density polyethylene having a density of 0.939 g/cm³, a melting point of 133° C., a MFR of 7 g/10 min and a thickness of 0.020 mm. The base paper 11 had a basis weight of 280 g/m², a thickness of 0.31 mm and a moisture content of 8.5%. The base paper 11 was selected from those obtained by a fortlinear paper machine or a cylinder paper machine. The interface defined between the base paper 11 and the low m.p. thermoplastic synthetic resin film 12 was entirely filled with a layer of self-expansile ink 16 while the surface of said film 12 was entirely coated with the compatibly expansile ink 14 which was then partially coated with the separately prepared compatibly expansile ink 15. In this manner, a lamination having a total thickness of 0.4 mm was obtained. Heating this lamination by the far infrared radiation heater at a temperature of 125° C. for 2–4 minutes expanded the low m.p. thermoplastic synthetic resin film 12 to a thickness of 0.470–0.770 mm and a total thickness of the container body wall reached to 0.8–1.1 mm, i.e., the lamination was expanded to a thickness approximately 7–10 times of its initial thickness. It was observed that the expansion ratio of the film 12 tends to increase as the moisture content of the base paper and the time period of heating increase.

High m.p. thermoplastic synthetic resin film 22 similar to the high m.p. thermoplastic synthetic resin film 13 which is laminated on the inner wall surface of the container body 1 is laminated on the inner wall surface of base paper 21 for the bottom wall 2 of the insulating paper container. This film 22 is unexpanded even by heating treatment and forms the inner wall surface continuous with the container body 1.

In the case of a bowl-like container which is relatively large in diameter and relatively small in height, it is possible for the consumer to hold the container only by supporting the container from its bottom with the fingers, for example, extending into a raised bottom's space 23. To protect the consumer from getting burnt in the hand, low m.p. thermoplastic synthetic resin film similar to the low m.p. thermoplastic synthetic resin film 12 laminated on the inner wall surface of the container body 1 may be laminated on the outer wall surface of the base paper 21 for the bottom wall 2 and may be subjected to heating treatment for expansion of this film. A layer of self-expansile ink may be disposed between the base paper 21 and the low m.p. thermoplastic synthetic resin film to increase expansion ratio of said low m.p. thermoplastic synthetic resin film.

It is also possible to laminate low m.p. thermoplastic synthetic resin film on the upper surface of high m.p. thermoplastic synthetic resin film which is unexpanded even by heating treatment and laminated on the inner wall surface of the base paper 21 for the bottom wall 2 of the insulating paper container. Such lamination may be then subjected to heating treatment to obtain a high adhesive effect between said high m.p. thermoplastic synthetic resin film laminated on the inner wall surface of the base paper for the container body and said low m.p. thermoplastic synthetic resin film laminated on said high m.p. thermoplastic synthetic resin film. In this way, a reliable sealability is obtained on the inner wall surface of the container. For example, a thickness of the low m.p. thermoplastic synthetic resin film laminated on the outer wall surface of the base paper 21 for the bottom wall 2 may be adjusted to 0.060 mm while layers of high and low m.p. thermoplastic synthetic resin film may be adjusted to have thickness of 0.015 mm, respectively, i.e., to have a total thickness of about 0.030 mm.

The upper surface of the compatibly expansile ink layer 14 laminated on the expandable thermoplastic synthetic resin film 12 which is, in turn, laminated on the container body 1 may be additionally coated with expansion inhibiting ink, self-expansile ink or the like.

In the case of the embodiment wherein the surface of the compatibly expansile ink layer 14 is coated with the self-expansile ink, said self-expansile ink is expanded as the low density polyethylene film 12 is expanded so that a region of the film 12 coated with said self-expansile ink protrudes. Such embodiment is suitable for the purpose of, for example, emphasizing the designs. Alternatively, the self-expansile ink may be applied on the compatibly expansile ink layer 14 which is applied on the upper surface of the low density polyethylene film 12 as primer and the lamination may be expanded as in the above-mentioned embodiment. As a result, the region printed with the self-expansile ink protrudes relative to the remaining region of said primer so that the printed region becomes convex and the remaining region becomes concave. Thus, a three dimensional impression makes the printed matter distinct.

In the case of the embodiment wherein the surface coated with the self-expansile ink is further coated with over-printing, said over-printing being of a relatively low expansion ratio may be advantageously used when it is desired to obtain the printed matter more glossy or more frosted than the ordinary ink. The self-expansile ink layer having a region coated with the over-printing for glazing effect and a region coated with the over-printing for frosting effect may be expanded in the same manner as in the above-mentioned embodiment, to give the printed matter an appropriate contrast.

It is also possible without departing from the scope of this invention to coat the layer of compatibly expansile ink 14 with a layer of expansion inhibiting ink. In this case, the compatibly expansile ink 14 is suitable for use as primer applied on the entire outer wall surface of the container body 1 in order to make said entire outer wall surface appear as if it is the base paper's ground texture or applied on a large area to occupied by print of capital letters or the like. On the other hand, the expansion inhibiting ink is suitable for printing of fine printed matter such as bar codes.

The insulating paper container coated with the compatibly expansile ink 14 which is then coated with the expansion inhibiting ink may be subjected to heating treatment in the same manner as in the previous embodiment to ensure that the region printed with the compatibly expansile ink 14 and the expansion inhibiting ink becomes concave while the region printed with the compatibly expansile ink 14 only becomes convex. In this way, the printed matter is given a three dimensional impression and correspondingly becomes distinct. While use of transparent expansion inhibiting ink makes the matter printed with the compatibly expansile ink 14 distinctly appear, the expansion inhibiting ink is not limited to such transparent expansion inhibiting ink.

The expansion inhibiting ink is composed of a resinous portion comprising vinyl chloride/vinyl acetate polymer and acrylic resin mixed with special inhibitor, solvent including methyl ethyl ketone, ester acetate and triol, and pigment. The expansion inhibiting ink may be applied directly on the low density polyethylene film 12 to inhibit its expansion or reduce its expansion ratio so that the region coated with the expansion inhibiting ink becomes concave relative to the remaining region of the film. In view of such characteristics, the low density polyethylene film 12 may be applied with the compatibly expansile ink 14 and then this compatibly expansile ink 14 may be partially coated with the expansion inhibiting ink to ensure that the region applied with the expansion inhibiting ink appears slightly concave relative to the remaining region. The fact that an expansion of the printed matter is inhibited or at least reduced correspondingly makes the printed matter distinct. Accordingly, use of the expansion inhibiting ink is suitable for printing of fine letters or patterns such as bar codes.

As will be apparent from the foregoing description, this invention provides stock material, as illustrated in FIGS. 2 and 3, for an insulating paper container which is improved in its printability for bar codes or the like as well as in its insulating property, an improved process for making such stock material and an improved process for making the insulating paper container. First, this invention provides a process for making stock material for a container body of an insulating paper container comprising steps of laminating low m.p. thermoplastic synthetic resin film which is expandable by heating treatment on the outer wall surface of base paper as said stock material for the container body of the insulating paper container and applying the surface of said low m.p. thermoplastic synthetic-resin film with compatibly expansile ink adapted to be expansile compatibly with expansion of said film. The compatibly expansile ink is expansile in response to expansion of the low m.p. thermoplastic synthetic resin film without obstructing the expansion of said film. Accordingly, the low m.p. thermoplastic synthetic resin film to be expanded may be previously applied on its surface with said compatibly expansile ink to obtain a smooth printing surface substantially free from a touch of irregularity after said thermoplastic synthetic resin film has been expanded. In this way, POS bar codes or the like can be distinctly printed on the layer of said compatibly expansile ink. In addition, the low m.p. thermoplastic synthetic resin film to be expanded may be previously applied on its surface with said compatibly expansile ink to prevent the printing ink from being soaked into the base paper and thereby to facilitate a recycling treatment of the base paper from the used insulating paper container according to this invention.

According to one preferred embodiment, said surface of the low m.p. thermoplastic synthetic resin film which is expandable by heating treatment is coated with said compatibly expansile ink as primer. The property of said compatibly expansile ink allowing the thermoplastic synthetic resin film to offer the smooth printing surface substantially free from a touch of irregularity after its expansion advantageously provides various possibilities. First, said compatibly expansile ink previously applied as primer on the entire surface of said low m.p. thermoplastic synthetic resin film to be expanded ensures the expanded resin film surface to present an appearance as if its is the surface of the base paper itself. Upon such a surface, various objects can be printed in so-called false printing fashion, i.e., as if they are printed on the base paper Is ground texture. Secondly, the compatibly expansile ink is able to confine the water vapor generated from the low m.p. thermoplastic synthetic resin film during its expansion and thereby to promote the expansion rather than inhibiting it. As a result, the compatibly expansile ink is effective to increase a thickness of the expanded synthetic resin film without being affected by printing.

According to another preferred embodiment of this invention, the compatibly expansile ink applied as said primer is of white color. The compatibly expansile ink of white color may be applied on the resin film as primer to ensure that the surface of the expanded resin film appears like the white ground of Japanese paper and gives the paper container a good aesthetic appearance.

According to still another preferred embodiment of this invention, patterns, designs, letters, bar codes or the like are printed on the surface of said compatibly expansile ink using separately prepared compatibly expansile ink. In view of the advantageous property of the compatibly expansile ink allowing a smooth printing surface substantially free from a touch of irregularity on the expanded thermoplastic synthetic resin film, said separately prepared compatibly expansile ink may be used to print patterns, designs, letters bar codes or the like on such smooth printing surface to obtain a distinct image of POS bar codes or the like.

According to further another preferred embodiment of this invention, an interface defined between the base paper and the low m.p. thermoplastic synthetic resin film is at least partially filled with a layer of self-expansile ink. The layer of self-expansile ink disposed between the base paper and the low m.p. thermoplastic synthetic resin film to be expanded improves an expansion effect as well as an insulating effect of the container. This is for the reason that not only expansion of said self-expansile ink correspondingly increases the thickness of the container body's wall but also the region of the resin film covered with said self-expansile ink is expanded with air bubbles or relatively large sizes and consequently an advantageously thick layer of expansion is obtained. Accordingly, the interface defined between the base paper and the low m.p. thermoplastic synthetic resin film maybe entirely filled with the self-expansile ink and said effects may be correspondingly improved.

According to another preferred embodiment of this invention, high m.p. thermoplastic synthetic resin film which is unexpanded even by heating treatment is laminated on the inner wall surface of the base paper as the stock material for the container body. The high m.p. thermoplastic synthetic resin film functions to block evaporation of moisture from said inner wall surface of the base paper during expansion of the low m.p. thermoplastic synthetic resin film.

For implementation of this invention, the base paper is preferably selected from air-permeably product obtained by the fortlinear paper machine or the cylinder paper machine in order to improve the expanding effect.

According to this invention, low m.p. thermoplastic synthetic resin film is laminated on the outer wall surface of the base paper for the bottom wall and expanded by subjecting this lamination to heating treatment. In the case of the container like a bowl which is relatively large in its diameter and relatively small in its height, the consumer's hand may sometimes come in contact with the bottom of such container. The apprehension that the consumer might get burnt in the hand can be effectively avoided by coating the outer wall surface of the stock material for the bottom wall with the expanded insulating layer.

According to another preferred embodiment of this invention, low m.p. thermoplastic synthetic resin film is laminated on the upper surface of high m.p. thermoplastic synthetic resin film which is unexpanded even by heating treatment, said high m.p. thermoplastic synthetic resin film, in turn, being laminated on the inner wall surface of the base paper for the bottom wall of the insulating paper container, and said low m.p. thermoplastic synthetic resin film is expanded by subjecting the lamination to heating treatment to expand said low m.p. thermoplastic synthetic resin film.

According to one preferred embodiment of this invention, the low m.p. thermoplastic synthetic resin film which is expandable by heating treatment is made of low density polyethylene having a MFR (melt flow rate) of 8–15 g/10 min and a thickness of 0.03–0.07 mm. Use of such low m.p. thermoplastic synthetic resin film facilitates the step of lamination on the base paper and ensures that the compatibly expansile ink may follow expansion of said low density polyethylene to cover the expanded surface in the form of a smooth printing surface on which a distinct printing can be achieved.

According to another preferred embodiment of this invention, the high m.p. thermoplastic synthetic resin film which is unexpanded even by heating treatment is made of medium density polyethylene having a MFR (melt flow rate) of 4–8 g/10 min. Use of such medium density polyethylene as the high m.p. thermoplastic synthetic resin facilitates the step of lamination on the base paper and ensures a high sealability of the container after heating treatment.

According to one preferred embodiment of this invention, the base paper has a basis weight of 150–350 $g/m^2$ and a moisture content of 5–9%. In view of desired strength and workability of the base paper as well as desired expansion ratio and post-expansion insulating property of the laminated thermoplastic synthetic resin, the base paper preferably has a basis weight of 150–350 $g/m^2$ and a moisture content of 5–9%.

According to another preferred embodiment of this invention, the heating treatment is carried out at a temperature of 120–130° C. for 2–4 minutes.

What is claimed is:

1. Stock material for a container body of an insulating paper container, comprising:

a base paper;

a first thermoplastic synthetic resin film laminated on an inner wall surface of said base paper;

a second thermoplastic synthetic resin film laminated on an outer wall surface of said base paper wherein said second thermoplastic synthetic resin film is expandable by heat treatment; and an ink which expands commensurately with the expansion of said second thermoplastic film applied on an outer surface of the second thermoplastic resin film, the outer surface of the second thermoplastic film being printed with indicia using separately prepared ink.

2. The stock material according to claim 1, wherein said ink is applied as a primer on the outer surface of the second thermoplastic synthetic resin film.

3. The stock material according to claim 1, wherein said ink applied as said primer is white.

4. The stock material according to claim 1, wherein an interface defined between the base paper and the second thermoplastic synthetic resin film is at least partially filled with a layer of self-expansile ink.

5. The stock material according to claim 2, wherein an interface defined between the base paper and the second thermoplastic synthetic resin film is at least partially filled with a layer of self-expansile ink.

6. The stock material according to claim 3, wherein an interface defined between the base paper and the second thermoplastic synthetic resin film is at least partially filled with a layer of self-expansile ink.

7. The stock material according to claim 1, wherein the second thermoplastic synthetic resin film is made of a low density polyethylene having a melt flow rate of 8–15 g/10 min and a thickness of 0.03–0.07 mm.

8. The stock material according to claim 2, wherein the second thermoplastic synthetic resin film is made of a low density polyethylene having a melt flow rate of 8–15 g/10 min and a thickness of 0.03–0.07 mm.

9. The stock material according to claim 3, wherein the second thermoplastic synthetic resin film is made of a low density polyethylene having a melt flow rate of 8–15 g/10 min and a thickness of 0.03–0.07 mm.

10. The stock material according to claim 4, wherein the second thermoplastic synthetic resin film is made of a low density polyethylene having a melt flow rate of 8–15 g/10 min and a thickness of 0.03–0.07 mm.

11. The stock material according to claim 1, wherein the first thermoplastic synthetic resin film is not expandable by heat treatment and is made of a medium density polyethylene having a melt flow rate of 4–8 g/10 min.

12. The stock material according to claim 2, wherein the first thermoplastic synthetic resin film is not expandable by heat treatment and is made of a medium density polyethylene having a melt flow rate of 4–8 g/10 min.

13. The stock material according to claim 3, wherein the first thermoplastic synthetic resin film is not expandable by heat treatment and is made of a medium density polyethylene having a melt flow rate of 4–8 g/10 min.

14. The stock material according to claim 4, wherein the first thermoplastic synthetic resin film is not expandable by heat treatment and is made of a medium density polyethylene having a melt flow rate of 4–8 g/10 min.

15. The stock material according to claim 7, wherein the first thermoplastic synthetic resin film is not expandable by heat treatment and is made of a medium density polyethylene having a melt flow rate of 4–8 g/10 min.

16. An insulating paper container comprising:

a container body and a bottom wall;

a first thermoplastic synthetic resin film laminated on an inner wall surface of a base paper of said container body and said bottom wall;

a second thermoplastic synthetic resin film laminated on an outer wall surface of said base paper of said container body; and an ink which expands commensurately with expansion of said second thermoplastic film applied on an outer surface of the second thermoplastic resin film so that said ink follows the expansion of said second thermoplastic synthetic resin film;

wherein said second thermoplastic synthetic resin film is expanded and the outer surface of the second thermoplastic film is printed with indicia using separately prepared ink.

17. The insulating paper container according to claim 16, wherein the outer surface of the second thermoplastic synthetic resin layer is expandable by heating treatment and has applied thereto said ink as a primer.

18. The insulating paper container material according to claim 17, wherein said ink applied as said primer is white.

19. The insulating paper container according to claim 16, wherein an interface defined between the base paper and the second thermoplastic synthetic resin film is at least partially filled with self-expansile ink.

20. The insulating paper container according to claim 17, wherein an interface defined between the base paper and the second thermoplastic synthetic resin film is at least partially filled with self-expansile ink.

21. The insulating paper container according to claim 18, wherein an interface defined between the base paper and the second thermoplastic synthetic resin film is at least partially filled with self-expansile ink.

22. The insulating paper container according to claim 16, wherein the second thermoplastic synthetic resin film is laminated on an outer wall surface of the base paper of the bottom wall and said second thermoplastic synthetic resin film is expanded by subjecting the outer wall surface of the base paper of the bottom wall to heating treatment.

23. The insulating paper container according to claim 17, wherein the second thermoplastic synthetic resin film is laminated on an outer wall surface of the base paper of the bottom wall and said second thermoplastic synthetic resin film is expanded by subjecting the outer wall surface of the base paper of the bottom wall to heating treatment.

24. The insulating paper container according to claim 18, wherein the second thermoplastic synthetic resin film is laminated on an outer wall surface of the base paper of the bottom wall and said second thermoplastic synthetic resin film is expanded by subjecting the outer wall surface of the base paper of the bottom wall to heating treatment.

25. The insulating paper container according to claim 19, wherein the second thermoplastic synthetic resin film is laminated on an outer wall surface of the base paper of the bottom wall and said second thermoplastic synthetic resin film is expanded by subjecting the outer wall surface of the base paper of the bottom wall to heating treatment.

26. The insulating paper container according to claim 16, wherein the second thermoplastic synthetic resin film is further laminated on an outer surface of the first thermoplastic synthetic resin film on the base paper of the bottom wall, and wherein the second thermoplastic synthetic resin film laminated on the base paper of the container body is expanded by subjecting the lamination to heating.

27. The insulating paper container according to claim 17, wherein the second thermoplastic synthetic resin film is further laminated on an outer surface of the first thermoplastic synthetic resin film on the base paper of the bottom wall, and wherein the second thermoplastic synthetic resin film laminated on the base paper of the container body is expanded by subjecting the lamination to heating.

28. The insulating paper container according to claim 18, wherein the second thermoplastic synthetic resin film is further laminated on an outer surface of the first thermoplastic synthetic resin film on the base paper of the bottom wall, and wherein the second thermoplastic synthetic resin film laminated on the base paper of the container body is expanded by subjecting the lamination to heating.

29. The insulating paper container according to claim 19, wherein the second thermoplastic synthetic resin film is further laminated on an outer surface of the first thermoplastic synthetic resin film on the base paper of the bottom wall, and wherein the second thermoplastic synthetic resin film laminated on the base paper of the container body is expanded by subjecting the lamination to heating.

30. The insulating paper container according to claim 22, wherein the second thermoplastic synthetic resin film is further laminated on an outer surface of the first thermoplastic synthetic resin film on the base paper of the bottom wall, and wherein the second thermoplastic synthetic resin film laminated on the base paper of the container body is expanded by subjecting the lamination to heating.

31. The insulating paper container according to claim 16, wherein the second thermoplastic synthetic resin film is expandable by heat treatment and is made of a low density polyethylene having a melt flow rate of 8–15 g/10 min and a thickness of 0.03–0.07 mm.

32. The insulating paper container according to claim 17, wherein the second thermoplastic synthetic resin film is expandable by heat treatment and is made of a low density polyethylene having a melt flow rate of 8–15 g/10 min and a thickness of 0.03–0.07 mm.

33. The insulating paper container according to claim 18, wherein the second thermoplastic synthetic resin film is expandable by heat treatment and is made of a low density polyethylene having a melt flow rate of 8–15 g/10 min and a thickness of 0.03–0.07 mm.

34. The insulating paper container according to claim 19, wherein the second thermoplastic synthetic resin film is expandable by heat treatment and is made of a low density polyethylene having a melt flow rate of 8–15 g/10 min and a thickness of 0.03–0.07 mm.

35. The insulating paper container according to claim 22, wherein the second thermoplastic synthetic resin film is expandable by heat treatment and is made of a low density polyethylene having a melt flow rate of 8–15 g/10 min and a thickness of 0.03–0.07 mm.

36. The insulating paper container according to claim 26, wherein the second thermoplastic synthetic resin film is expandable by heat treatment and is made of a low density polyethylene having a melt flow rate of 8–15 g/10 min and a thickness of 0.03–0.07 mm.

37. The insulating paper container according to claim 16, wherein the first thermoplastic synthetic resin film is not expandable by heat treatment and is made of a medium density polyethylene having a melt flow rate of 4–8 g/10 min.

38. The insulating paper container according to claim 17, wherein the first thermoplastic synthetic resin film is not expandable by heat treatment and is made of a medium density polyethylene having a melt flow rate of 4–8 g/10 min.

39. The insulating paper container according to claim 18, wherein the first thermoplastic synthetic resin film is not expandable by heat treatment and is made of a medium density polyethylene having a melt flow rate of 4–8 g/10 min.

40. The insulating paper container according to claim 19, wherein the first thermoplastic synthetic resin film is not expandable by heat treatment and is made of a medium density polyethylene having a melt flow rate of 4–8 g/10 min.

41. The insulating paper container according to claim 22, wherein the first thermoplastic synthetic resin film is not expandable by heat treatment and is made of a medium density polyethylene having a melt flow rate of 4–8 g/10 min.

42. The insulating paper container according to claim 26, wherein the first thermoplastic synthetic resin film is not expandable by heat treatment and is made of a medium density polyethylene having a melt flow rate of 4–8 g/10 min.

43. The insulating paper container according to claim 31, wherein the first thermoplastic synthetic resin film is not expandable by heat treatment and is made of a medium density polyethylene having a melt flow rate of 4–8 g/10 min.

44. The insulating paper container according to claim 16, wherein the base paper has a basis weight of 150–350 g/m$^3$ and a moisture content of 5–9%.

45. The insulating paper container according to claim 17, wherein the base paper has a basis weight of 150–350 g/m$^3$ and a moisture content of 5–9%.

46. The insulating paper container according to claim 18, wherein the base paper has a basis weight of 150–350 g/m$^3$ and a moisture content of 5–9%.

47. The insulating paper container according to claim 19, wherein the base paper has a basis weight of 150–350 g/m$^3$ and a moisture content of 5–9%.

48. The insulating paper container according to claim 22, wherein the base paper has a basis weight of 150–350 g/m$^3$ and a moisture content of 5–9%.

49. The insulating paper container according to claim 26, wherein the base paper has a basis weight of 150–350 g/m$^3$ and a moisture content of 5–9%.

50. The insulating paper container according to claim 31, wherein the base paper has a basis weight of 150–350 g/m$^3$ and a moisture content of 5–9%.

51. The insulating paper container according to claim 37, wherein the base paper has a basis weight of 150–350 g/m$^3$ and a moisture content of 5–9%.

52. The insulating paper container according to claim 16, wherein the base paper is the product a paper making process which employs a fortlinear paper machine or a cylinder paper machine to produce the base paper.

53. The insulating paper container according to claim 17, wherein the base paper is the product a paper making process which employs a fortlinear paper machine or a cylinder paper machine to produce the base paper.

54. The insulating paper container according to claim 18, wherein the base paper is the product a paper making process which employs a fortlinear paper machine or a cylinder paper machine to produce the base paper.

55. The insulating paper container according to claim 19, wherein the base paper is the product a paper making process which employs a fortlinear paper machine or a cylinder paper machine to produce the base paper.

56. The insulating paper container according to claim 22, wherein the base paper is the product a paper making process which employs a fortlinear paper machine or a cylinder paper machine to produce the base paper.

57. The insulating paper container according to claim 26, wherein the base paper is the product a paper making process which employs a fortlinear paper machine or a cylinder paper machine to produce the base paper.

58. The insulating paper container according to claim 31, wherein the base paper is the product a paper making process which employs a fortlinear paper machine or a cylinder paper machine to produce the base paper.

59. The insulating paper container according to claim 37, wherein the base paper is the product a paper making process which employs a fortlinear paper machine or a cylinder paper machine to produce the base paper.

60. The insulating paper container according to claim 44, wherein the base paper is the product a paper making process which employs a fortlinear paper machine or a cylinder paper machine to produce the base paper.

* * * * *